United States Patent [19]

Engle et al.

[11] 4,284,246
[45] Aug. 18, 1981

[54] HONEY PIT FERTILIZATION SYSTEM

[75] Inventors: Carl E. Engle, Fremont; Don Moldenhauer, Clintonville, both of Wis.

[73] Assignee: Hydro Ag-Tech Inc., St. Paul, Minn.

[21] Appl. No.: 3

[22] Filed: Jan. 2, 1979

[51] Int. Cl.³ .............................................. B02C 18/40
[52] U.S. Cl. .................................. 241/222; 241/101.7
[58] Field of Search ................ 241/101.2, 101.7, 280, 241/277, 221, 222, 295

[56] References Cited

U.S. PATENT DOCUMENTS

| | | | |
|---|---|---|---|
| 838,370 | 12/1906 | Belt et al. | 241/295 X |
| 2,914,259 | 11/1959 | Hestvik et al. | 241/295 X |
| 2,981,487 | 4/1961 | Davis | 241/222 |

FOREIGN PATENT DOCUMENTS 2727164  12/1977  Fed. Rep. of Germany ........ 241/101.7

OTHER PUBLICATIONS

Implement & Tractor, *Manure By Irrigation,* Tom Gilling, Sep. 20, 1958, pp. 36–37.

Primary Examiner—Mark Rosenbaum
Attorney, Agent, or Firm—Alter and Weiss

[57] ABSTRACT

A fertilization system using the contents of the manure pits on farms to supply the fertilizer. The system comprising a pump for forcing the contents of the manure pits either directly through the irrigation piping system to the fields or for spraying the contents of the pits onto the fields. A unique pulverizer is used between an intake pipe set in the pits and the pump to assure that the contents of the pits do not clog the pump.

4 Claims, 3 Drawing Figures

HONEY PIT FERTILIZATION SYSTEM

This invention is concerned with fertilizer systems using the contents of manure pits; and more particularly, with improved fertilizer systems using a unique pulverizer in series with the pumps used in forcing the contents of the pits onto the fields for fertilization purposes.

In the past, manure pits or honey pits were emptied onto wagons which were then taken into the fields and the contents of the wagons were distributed into the field for fertilization purposes.

More recently, high pressure systems have been utilized to empty the honey pits and to distribute the contents of the honey pits onto the fields either by spraying or spreading.

The pressurized systems have not worked too well, because the pumps are continuously clogged by some of the contents of the honey pits. For example, many times refuse including feed and corn cobs find their way into honey pits. Herbaceous objects, such as corn cobs, are notorious for clogging the pumps.

Special pumps have been designed for the purpose of pressurizing systems using the contents of the honey pits to fertilize the fields. These pumps feature apertures capable of passing spherical solids up to 1¼ inches in diameter. They also utilize removable cover plates to enable access to the pump interior to make it easier to unclog the pumps. The pumps also include internal configuration designed to chop up herbaceous material, such as corn cobs. Notwithstanding the chopper devices, the pumps still tend to clog.

Some of the prior art patents showing a fertilization system include the patent to G. R. Roe, et al. which issued on June 7, 1932, as U.S. Pat. No. 1,862,238.

Roe, et al. teach the combination of adding fertilizers to an irrigation system. Roe, et al. use the combination of a fertilizer container and a pump for pumping the fertilizer from the container through the irrigation system. However, Roe, et al. were not faced with the problems of herbaceous materials clogging the pumps; and thus, did not have the problems encountered by those who are using honey pits as a source of fertilizer.

The patent to Schuler, et al. (U.S. Pat. No. 2,627,155) does include apparatus for comminuting herbaceous material, such as leaves and grass and the like. While Schuler, et al. do not accomplish the comminuting of the herbaceous material in conjunction with material being pumped through an irrigation system; nonetheless, they do teach a pulverizer specifically for use in conjunction with a pump. In this patent the vanes of the impeller wheel are used for accomplishing the pulverizing action. This is similar in effect to what is being attempted with the pumps specifically designed for use in emptying the honey pits.

Another patent showing the blades of an impeller used for comminuting as well as for the pumping action is U.S. Pat. No. 3,393,942, which issued on July 23, 1968 on an invention to M. Hanoya. A separate pulverizer for use with pumps is shown in U.S. Pat. No. 3,959,897 which issued on June 1, 1976 covering an invention to W. P. May. The May pulverizer is used in connection with dredging and accomplishes its pulverizing effects through the use of large forces primarily through a crushing action. It has been found that such an action is not suited for use with herbaceous material. As a matter of fact, the forces required do not give a cost efficient crusher and because the herbaceous material is a lot more resilient than the rock material that the crusher of the May patent encounteres, May's crusher is ineffective for use in a honey pit fertilization system.

Thus, while various irrigation systems are shown in the prior art, and especially designed pumps are available for use in emptying honey pits, there was no good system in the prior art available for use in pumping the contents of honey pits for fertilization purposes.

One of the reasons for the lack of such a system is the fact that the contents of honey pits contain the herbaceous refuse which have not been successfully pulverized or comminuted by the prior art systems.

Accordingly, an object of the present invention is to provide new and unique honey pit fertilization systems.

A related object of the present invention is to provide new and unique honey pit fertilization systems that are practically clog proof.

Yet another object of the present invention is to provide honey pit fertilization systems with a unique pulverizer for comminuting herbaceous materials.

Still another object of the present invention is to provide new and unique fertilization systems wherein the contents of the farm honey pits are spread throughout fields either using piping or by spraying, but also providing for preventing the clogging of the pump by use of unique pulverizing equipment.

Yet another object of the present invention is to provide honey pit fertilization systems with unique pulverizers having a plurality of parallel blades that are also parallel to the direction of flow of the material from the honey pit under the pressure provided by the pump.

A preferred embodiment of the present invention comprises a centrifugal pump attached to an intake line that is within a honey pit. Between the intake line and the pump is a unique pulverizer having a plurality of parallel circular blades turning on an axle which is driven by the same power source driving the pump. The rotating blades are also parallel to the direction of flow of the material in the honey pit under pressure of the pump.

The output of the pump is either forced through irrigation piping or sprayed over the field. The parallel blades are ideal for pulverizing herbaceous material, such as corn cobs.

These and other objects and features of the present invention will be best understood by making reference to the accompanying drawing, wherein.

Figure 1:
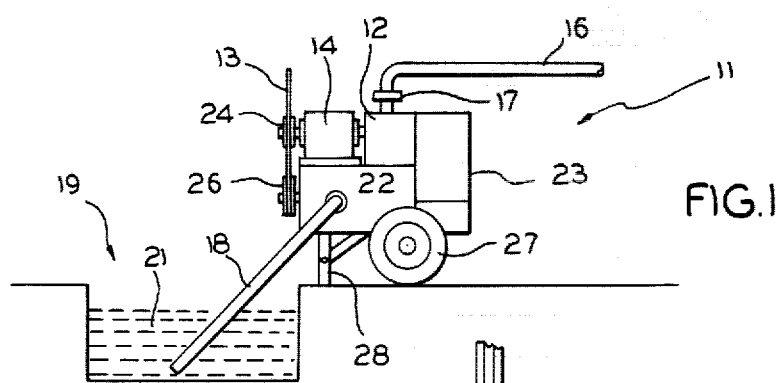
FIG. 1 is a pictorial representation of a wagon containing the pump and pulverizer coupled to the honey pit through an intake line and having an output pipe thereon.

In FIG. 1, the cart 11 comprises an assembly including a centrifugal pump 12 driven off of a drive belt 13 through a gear and bearing housing 14. The pump leads to an output pipe 16 through a pipe coupling 17. The pump input line 18 is dipped into the "honey" pit 19 containing manure and refuse 21 normally found in barns. The intake pipe 18 is shown as leading into a unique pulverizer assembly 22. A control box 23 may be used to control the operation of the pump and pulverizer.

It is to be noted that drive belt 13 is coupled to driven wheel 24 which leads to gear box and/or bearing arrangement 14, and also to driven wheel 26 leading to the pulverizer assembly 22. The belt 13 can come from a gas driven motor, electric motor or any other prime mover source.

It should be understood that the cart 11 can also be equipped with a gas driven motor for use as the prime mover. Further, it should be understood that the cart 11 shown with wheels, such as wheels 27 and 28, could be installed permanently or could be mounted on a truck bed in which case the drive belt could come from the engine of the truck. Any of the above-enumerated and other types of arrangements are within the scope of the invention which contemplates and is concerned with an irrigation system including a pump and a pulverizer at the input to the pump. The pulverizer assembly depicted as block 22 is shown in greater detail in FIGS. 2 and 3.

Figure 2:
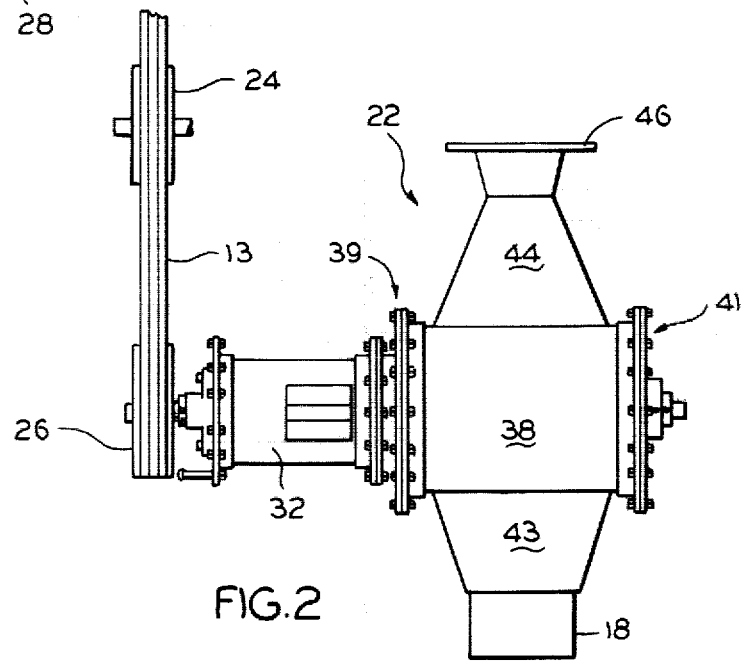
FIG. 2 is a plan view of the pulverizer showing the coupling to the drive power which also drives the pump.
Figure 3:
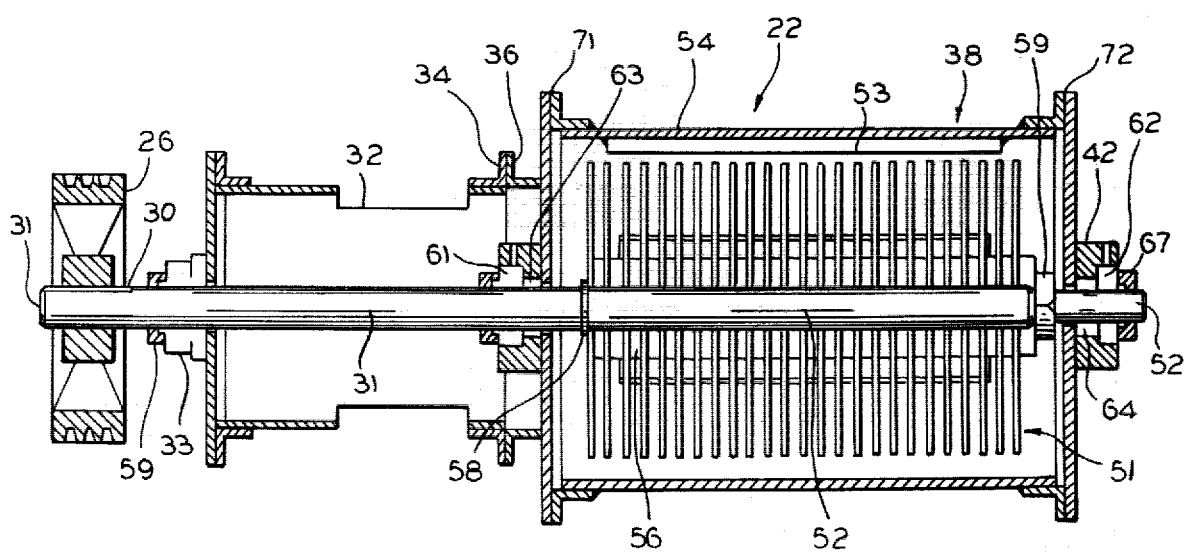
FIG. 3 is a sectional view of the pulverizer.

In FIG. 2, for example, belt wheel 24 is shown as coupled to the drive belt 13, and belt wheel 26 is also shwon driven by the belt 13. As shown in FIGS. 2 and 3 the wheel 26 is attached to an axle 31 by any well known means, such as key 30. The axle 31 is depicted as passing through a bearing block 32.

At the input to the bearing block 32 is shown lubricating means, such as lubricating cup 33. Bearing block flange plates, such as flange plates 34 and 36, are shown coupling the pulverizer assembly 22 to the bearing block 32. The pulverizer assembly 22 also includes the actual pulverizer means 38, shown in FIGS. 2 and 3. The pulverizer 38 also has flange plates, such as flange plates 39 and 41, at the sides of the pulverizer. The flange plates 39 and 41 further hold the lubricating cups, such as for example, the lubricating cup 42, shown at the right side of the pulverizer in FIG. 3.

The pulverizer assembly 22 includes an intake manifold 43 and an outlet manifold 44. The outlet manifold couples through a pipe, not shown, leading to the intake of the pump. The outlet manifold is shown as having a flange plate 46 for coupling to the pipe leading to the pump or alternatively directly to the pump input manifold. The intake pipe 18 leading from the manure pit 19 is shown as going directly into the intake manifold 43. The pipe 18, of course, could be coupled to the intake manifold by flange plates or any other well known means.

The pulverizer axle has a plurality of blades 51 mounted thereon. The blades are designed to rotate at a speed of 1200 RPM. The multiple blades 51 mounted on the axle 52 of the pulverizer are preferably approximately 7/16 inches apart. The blades may be mounted to the axle in any well known manner.

A bar shown as bar 53 is mounted along the length of one part of the inside of the cylinder case 54 of the pulverizer 38. The distance between the bar and the ends of the pulverizer blades in a preferred embodiment is 1/16 of an inch.

The cylinder 54 in a preferred embodiment has a 12 inch outer diameter, a 11.790 inch inner diameter and a 16 inch length. Spacers 56 are mounted on axle 52. Means, such as truarch ring 58, in combination with fasteners 59 hold the spacers 51 in a fixed position around the axle 52. In a preferred embodiment, the fastener 59 is a hexnut threaded to a portion of the shaft.

It is noted that the driver wheel 26 is a sheath type wheel. The driving mechanism could also comprise gears, rather than the belted drive shown and still be within the scope of the invention.

At the lubricating and bearing cup 33 there is a collar 60. At the other end of the bearing block is depicted bearings 61. Bearing 62 is shown at the other end of the pulverizer assembly. Also shown are seals 63 and 64, respectively, adjacent bearings 61 and 62. Collars 60 and 67 close off the ends of the pulverizer.

The blades 51, in a preferred embodiment, are combination saw blades with a 10" diameter and with a 1 7/32 inch bore fitting around the axle 52.

In a preferred embodiment gaskets, such as gasket 71 and 72, are provided at both ends of the pulverizer between the flanges 39 and 41. The flanges are held in place by well known fasteners typically used in such assemblies.

In use, then, the system provides an intake pipe which is lowered into the pit containing the manure and other debris from the floor of the barn, and the pump and pulverizer are started. The almost liquid manure and accompanying debris are pumped through the intake to the pulverizer into the pump and out through the outlet pipe either through irrigation pipes or sprayed along the fields. The unique pulverizer destroys solids, such as corn cobs and the like; thus preventing clogging the centrifugal pump. No herbaceous matter of any consequence can traverse the pulverizer.

While the principles of the invention have been described above in connection with specific apparatus and applications, it is to be understood that this description is made by way of example only and not as a limitation on the scope of the invention.

What is claimed is:

1. An improved system for pumping a mixture including solid animal waste and resilient herbaceous material from a honey pit, said mixture to be used for fertilizer, said mixture including a liquid portion, said system comprising:

pump means having an inlet and an outlet;

means to motivate said pump means to provide pump pressure required to move said mixture from said pit;

a conduit insertable into said pit to direct said mixture towards said pump means inlet;

a pulverizer assembly, said assembly having a cylindrical housing, said housing of a substantially uniform internal diameter, said assembly having an inlet and an outlet, said assembly positioned outside said pit, in the path of flow of said mixture, with said conduit communicating with said assembly inlet, and said assembly outlet communicating with said pump means inlet.

said assembly including a plurality of circular comminuting elements mounted axially within said housing on an axle, said elements parallel to and spaced apart from each other and from said housing to enable the liquid portion of said contents to flow between said elements to said pump means inlet;

bar means positioned within said housing to impact said solids as said solids are moved by said elements, said bar means positioned parallel to the axis of rotation of said elements and spaced apart from the outer periphery of said elements by a distance less than that of the size of solids pumpable by said pump, said assembly inlet and said assembly outlet positioned to direct the flow of said mixture transversely to said elements and said bar means, said elements contacting said animal waste and herbaceous solids to strike said bar means to reduce said solids to a size selected to allow for passage thereof through said pump means; and means communicating with said pump means outlet for distributing said contents onto fields for fertilization purposes.

2. The invention of claim 1 wherein said elements are rotated by said pump motivating means.

3. The invention of claim 1 wherein said elements are spaced apart from each other a distance less than the largest size solid that can be handled by said pump means without clogging.

4. The invention of claim 1 wherein the smallest distance between said elements and said impact means is no more than the distance between adjacent of said elements.

* * * * *